(12) United States Patent
Lo

(10) Patent No.: US 7,178,240 B2
(45) Date of Patent: Feb. 20, 2007

(54) METHOD FOR MOLDING BICYCLE TUBE

(76) Inventor: Chan Shen Lo, No.5, Alley 51, Lane 452, Shueiyuan Rd., Dajia Township, Taichung County 437 (TW)

( * ) Notice: Subject to any disclaimer, the term of this patent is extended or adjusted under 35 U.S.C. 154(b) by 152 days.

(21) Appl. No.: 11/013,416

(22) Filed: Dec. 17, 2004

(65) Prior Publication Data

US 2006/0130307 A1    Jun. 22, 2006

(51) Int. Cl.
B23P 17/00   (2006.01)
B23P 13/00   (2006.01)
B21D 26/02   (2006.01)
B21D 41/00   (2006.01)

(52) U.S. Cl. .................... 29/897; 29/421.1; 29/557; 29/558; 29/DIG. 3; 29/DIG. 11; 29/DIG. 47; 72/55; 72/56; 72/58; 72/61; 72/370.06; 72/370.22; 72/370.27

(58) Field of Classification Search ............. 29/897, 29/421.1, 557, 558, 564, DIG. 3, DIG. 11, 29/DIG. 18, DIG. 47; 72/31.04, 31.13, 55, 72/56, 58, 61, 368, 369, 370.06, 370.13, 72/370.22, 370.27
See application file for complete search history.

(56) References Cited

U.S. PATENT DOCUMENTS

| | | | | |
|---|---|---|---|---|
| 2,886,170 A | * | 5/1959 | Kerr | 72/283 |
| 4,416,134 A | * | 11/1983 | Hayashi | 72/68 |
| 4,484,756 A | * | 11/1984 | Takamiya et al. | 280/281.1 |
| 5,890,387 A | * | 4/1999 | Roper et al. | 72/58 |
| 5,974,846 A | * | 11/1999 | Ash | 72/55 |
| 6,513,242 B1 | * | 2/2003 | Christofaro et al. | 29/897.2 |
| 6,866,280 B2 | * | 3/2005 | Chang | 280/281.1 |
| 7,051,564 B2 | * | 5/2006 | Chang | 72/58 |

FOREIGN PATENT DOCUMENTS

| | | | | |
|---|---|---|---|---|
| JP | 53119266 A | * | 10/1978 |
| JP | 07199507 A | * | 8/1995 |
| JP | 11319965 A | * | 11/1999 |

\* cited by examiner

*Primary Examiner*—Jermie E. Cozart
(74) *Attorney, Agent, or Firm*—Rosenberg, Klein & Lee

(57) ABSTRACT

This invention relates to a method for molding a bicycle tube and the method comprises the following steps: first, providing a tube and then controlling thickness of the tube by a drawing and extruding process for forming a molding portion. Second, plasticize other portions of the tube into particular diameters and shapes by plasticizing processes. Third, hydroform the molding portion of the tube by a mold and a hydroforming device for forming particular three-dimensional shapes. By applying to the above-mentioned method, the tube could be molded into a three-dimensional, unique and delicate shape.

14 Claims, 6 Drawing Sheets

METHOD FOR MOLDING BICYCLE TUBE

TECHNICAL FIELD

The present invention relates to a method for molding a bicycle tube. More particularly, the present invention provides a method for molding unique, three-dimensional, and delicate shapes into the bicycle tube.

BACKGROUND OF THE INVENTION

Bicycle frames and handlebars are eye-catching and essential parts to bicycles. Generally, the bicycle frames and the handlebars are made up of metal tubes, which are straight, smooth and plain. In addition, equal thick and equal diametral tubes are selected for forming the bicycle frames and the handlebars, according to assembling needs. Therefore, for creating fancy and attractive appearances of the bicycles, the tubes of the bicycle frames and the handlebars are only given with colors, patterns, or some regular curves.

For improving variety and appearances of the bicycle frames and the handlebars, a conventional method for molding particular shapes into a bicycle tube is described as below. The method applies a molding device with projecting blocks to mold a tube and the molding device is placed within the tube. Then, the molding device is expanded outwardly within the tubes so the tube is molded into particular shapes by the projecting blocks of the molding device. However, the conventional method requires the molding device to be placed within the tube, also the molding device and the projecting blocks are designed to expand outwardly accordingly. Therefore, the conventional method only could apply to a tube, which is straight, equal diameter and round, such as a handlebar stem, a front fork, and a chain stay etc.

By applying to the conventional method, the molding shapes of the bicycle tube are limited and it is difficult to mold a three-dimensional, fine and delicate shape, such as shapes of trademark patterns; therefore, it would be desirable to provide a method that could mold a three-dimensional, unique and delicate shape to the bicycle tube, for creating a designed, fashion, and integrated appearance or structure to bicycles.

SUMMARY OF INVENTION

It is a primary object of the invention to provide a method for molding a unique, three-dimensional, and delicate shape to a bicycle tube so as to improve appearances and structures to bicycles.

More particularly, the method of the present invention comprises the following steps, which are: first, providing a tube and then controlling thickness of the tube by a drawing and extruding process for forming a molding portion. Second, plasticize other portions of the tube into particular diameters and shapes by plasticizing processes. Third, hydroform the molding portion of the tube by a mold and a hydroforming device for forming particular three-dimensional shapes. By applying to the above-mentioned method, the tube could be molded into a three-dimensional, unique and delicate shape.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
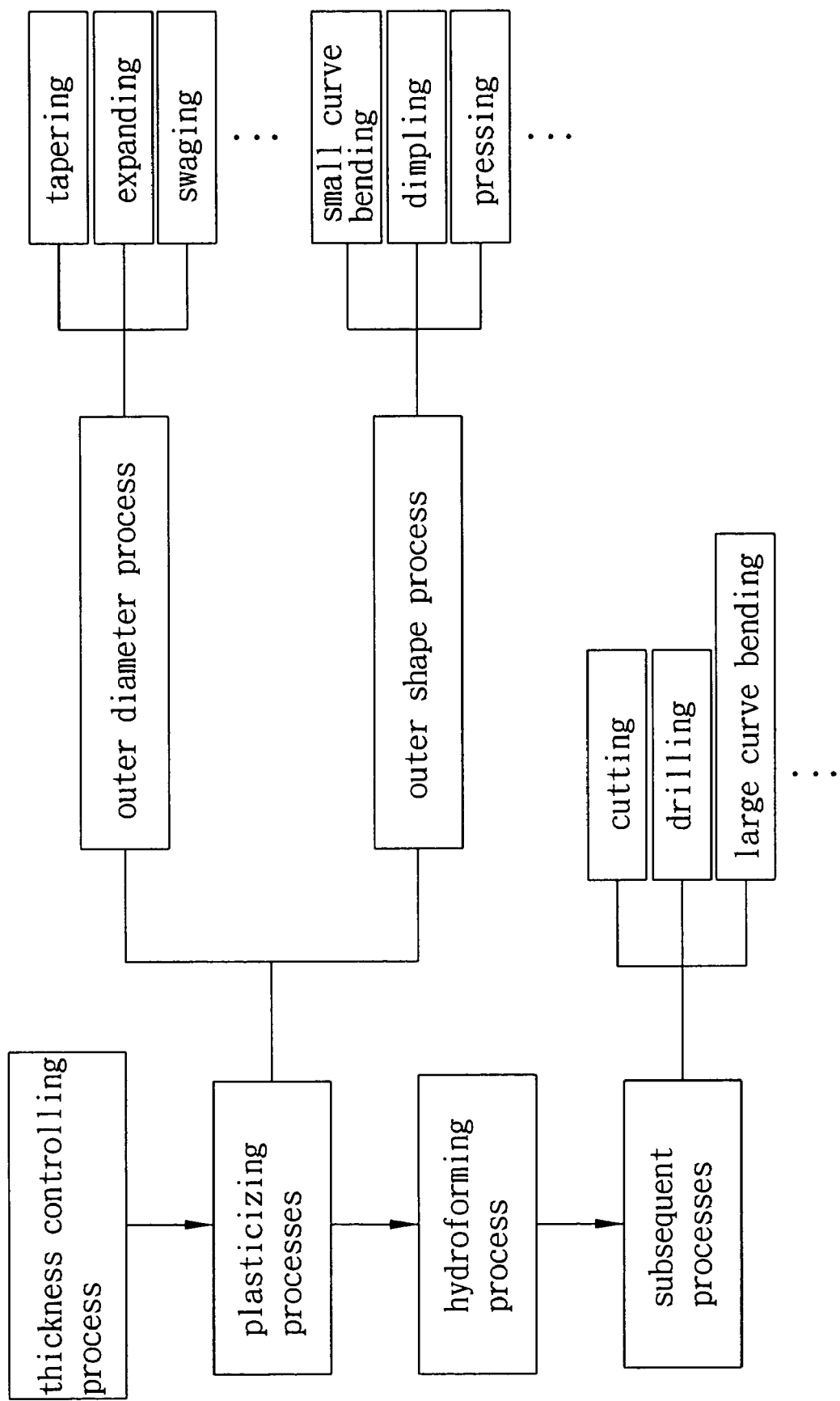
FIG. 1 is a schematic flow diagram of a method of the present invention, showing the processes for molding a tube.

With reference to FIG. 1, a method for molding a bicycle tube comprises the following steps: first, providing a tube and controlling thickness of the tube by a drawing and extruding process for forming a molding portion. After the drawing and the extruding process, the tube wall is formed into different thickness and the molding portion of the tube is arranged thicker than other portions of the tube for further molding purposes.

Figure 2:
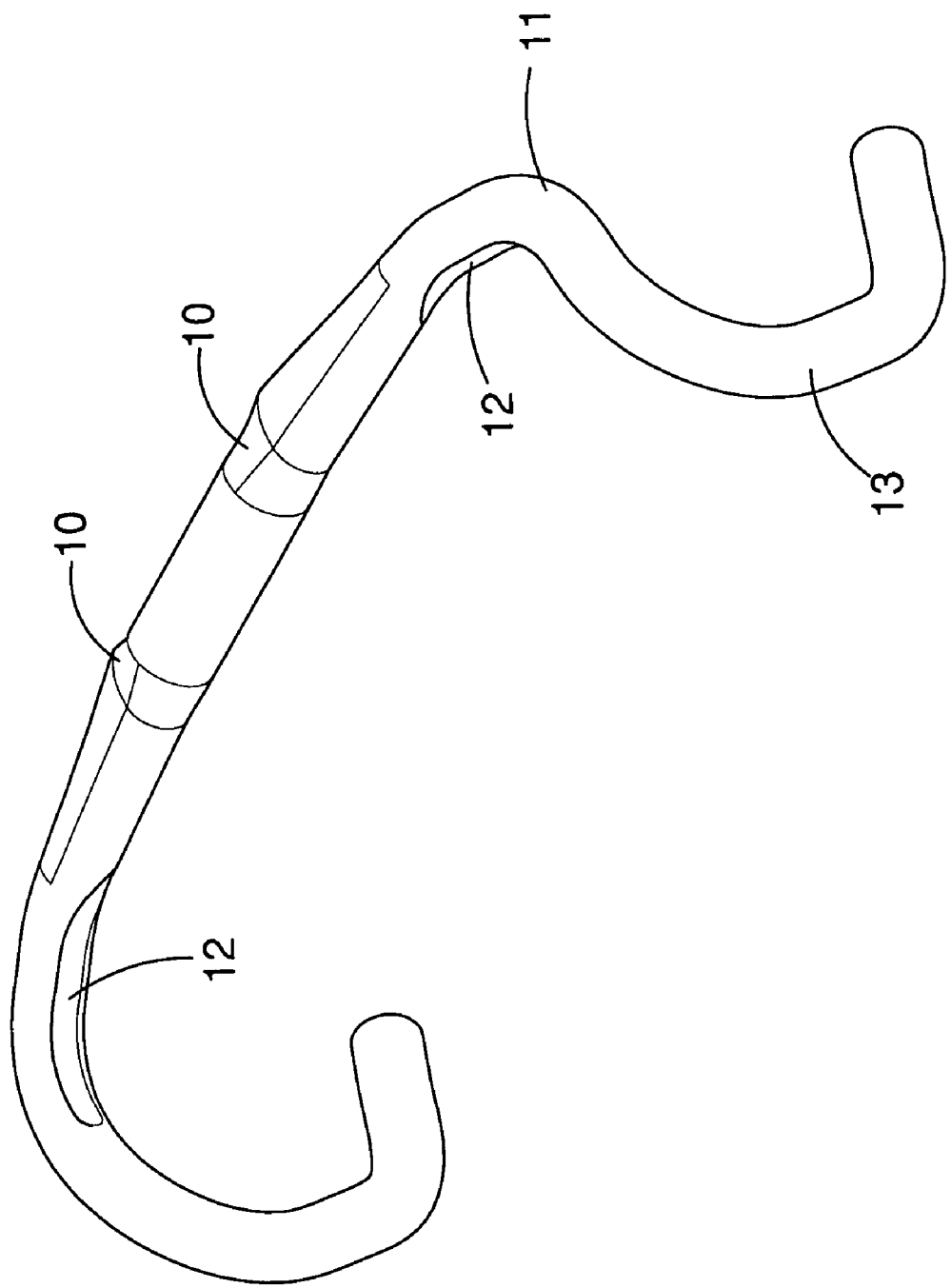
FIG. 2 shows the tube being tapered, small and large curve bended, and hydroformed.
Figure 3:
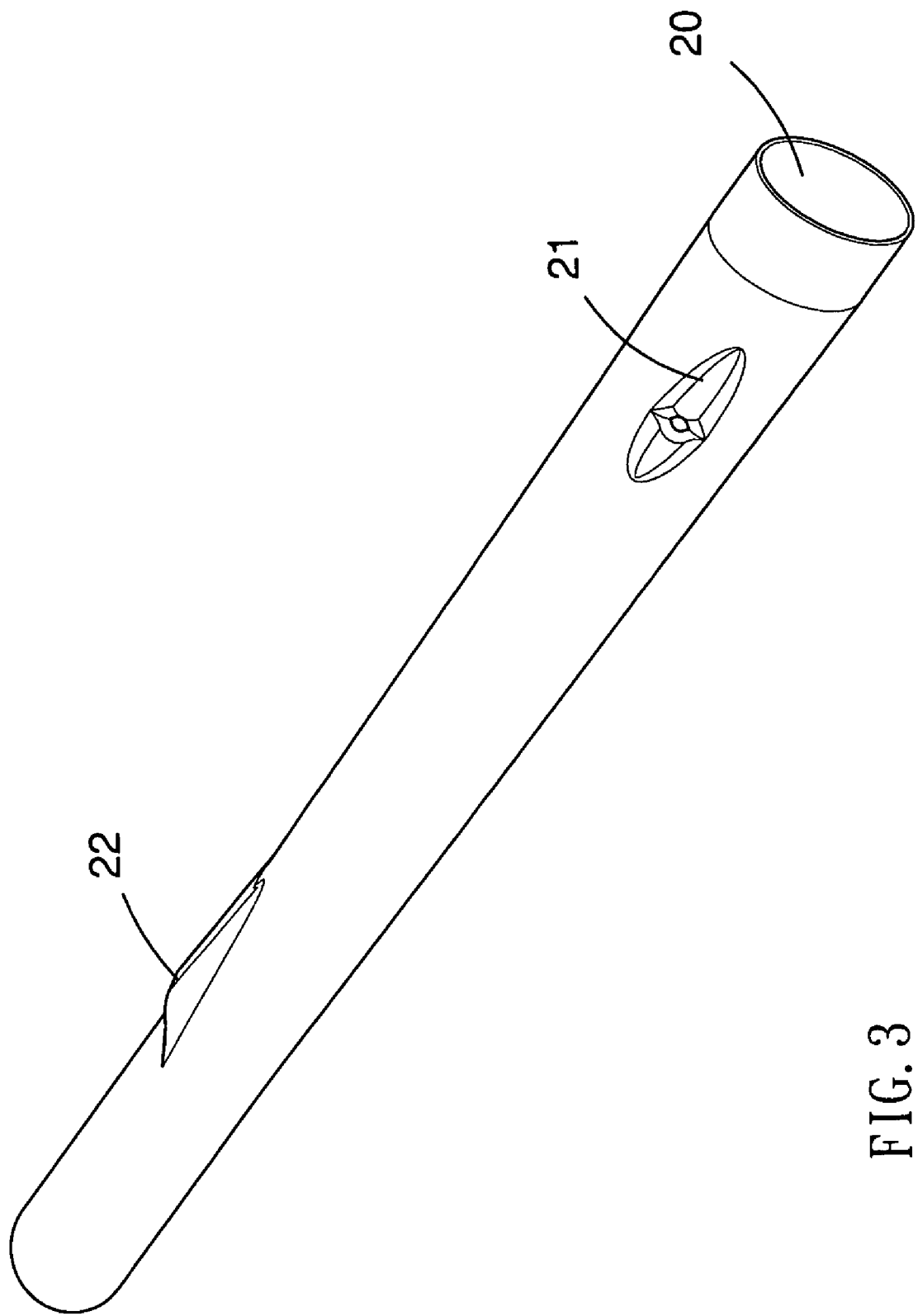
FIG. 3 shows the tube being expanded, dimpled and hydroformed.
Figure 4:
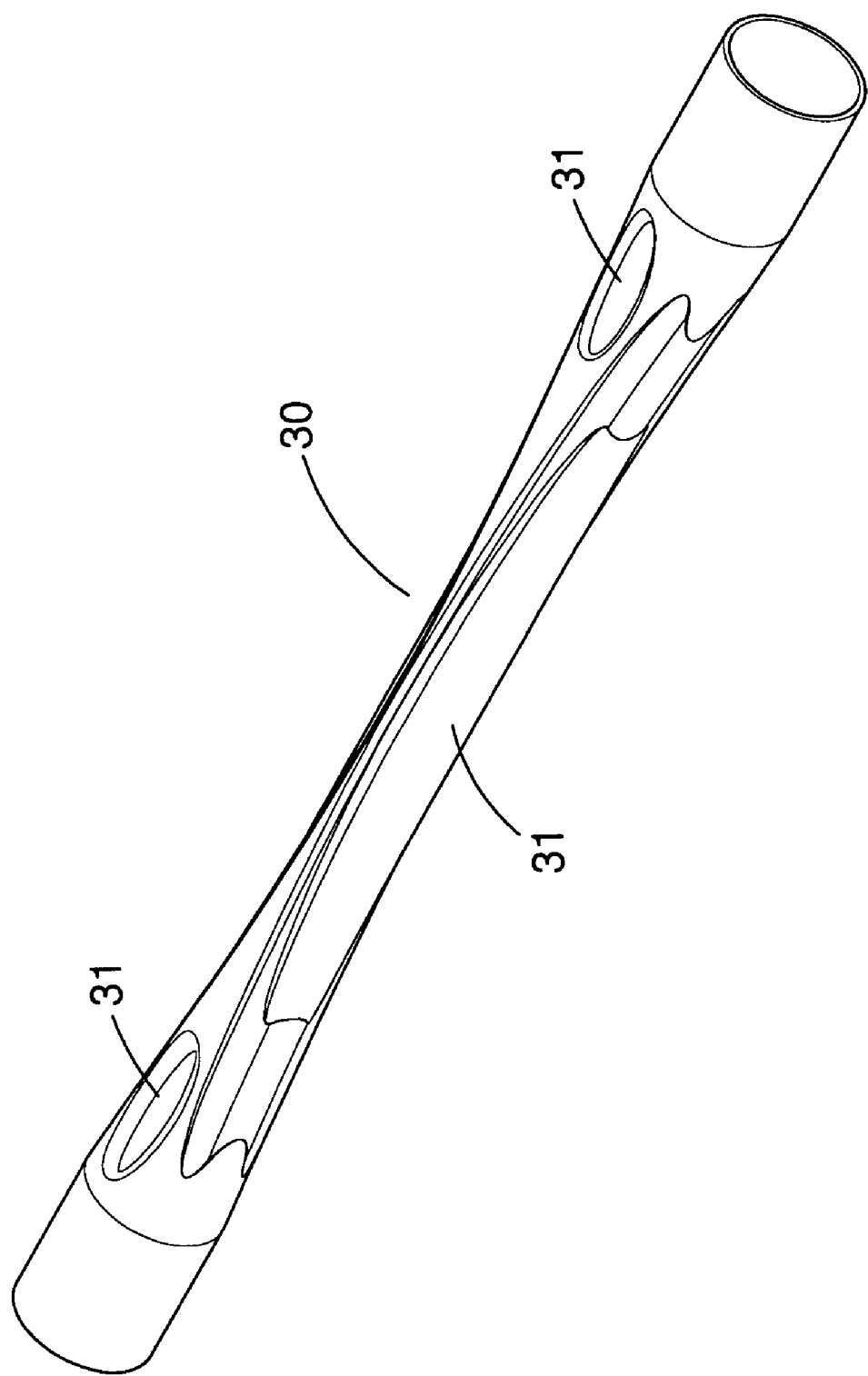
FIG. 4 shows the tube being swaged and hydroformed.

Second, plasticize other portions of the tube into particular diameters and shapes by plasticizing processes, which comprise an outer diameter process and an outer shape process. The outer diameter process further comprises tapering, expanding and swaging processes for forming varied diameters of the tube, by tube plasticizing devices. FIG. 2 shows a tapered shape 10 of the tube after the tapering process and FIG. 3 shows an expanded shape 20 of the tube after the expanding process. Furthermore, FIG. 4 shows a swaged shape of the tube after the swaging process.

Figure 5:
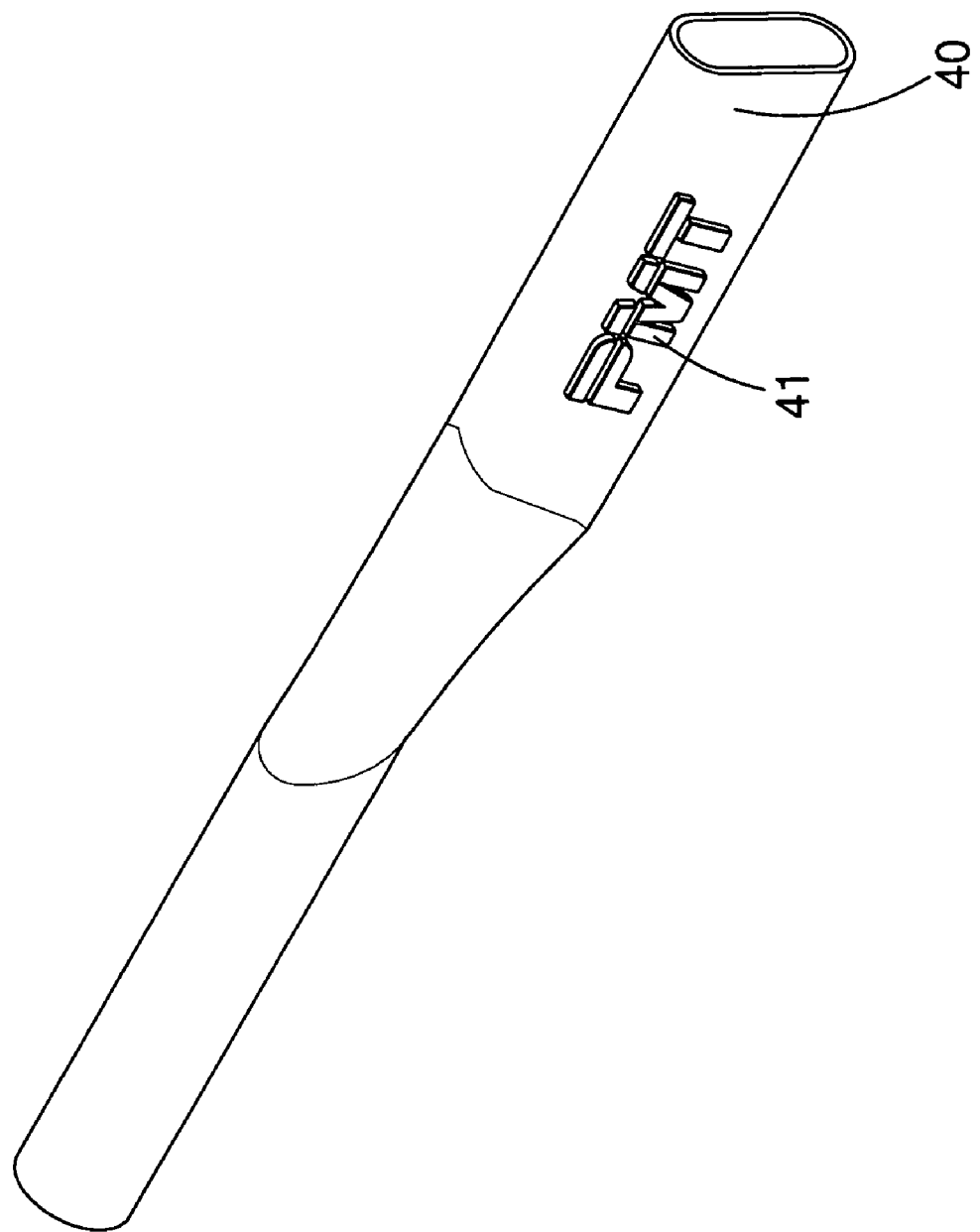
FIG. 5 shows the tube being pressed and hydroformed.

The outer shape process of the plasticizing processes further comprises small curve bending, dimpling and pressing processes for forming varied outer shapes of the tube, by tub processing devices. FIG. 2 shows a small curve shape 11 of the tube after the small curve bending process and a dimpled shape 21 of the tube is formed by the dimpling process as shown in FIG. 3. FIG. 5 shows the tube formed with a pressed shape 40 after the pressing process.

Third, hydroform the molding portion of the tube by a mold and a hydroforming device for forming particular three-dimensional shapes that is: firstly placing the molding portion of the tube into the mold, which has a mold cavity having large portions and narrow portions. Secondly, inject a high pressure oil into the tube by a hydroforming device, so the molding portion is molded into large portions, corresponding to the large portions of the mold cavity. Thirdly, stop injecting the high pressure oil into the tube and then seal ends of the tube. Last, exert an axial force to the high pressure oil from the ends of the tube, whereby the molding portion is further molded into narrow portions, corresponding to the narrow portions of the mold cavity. By applying to the hydroforming device and the mold, the molding portion of the tube could be molded into fine, small and three-dimensional shapes 12, 22, 31, 41, 50 as shown in FIGS. 2–6.

Figure 6:
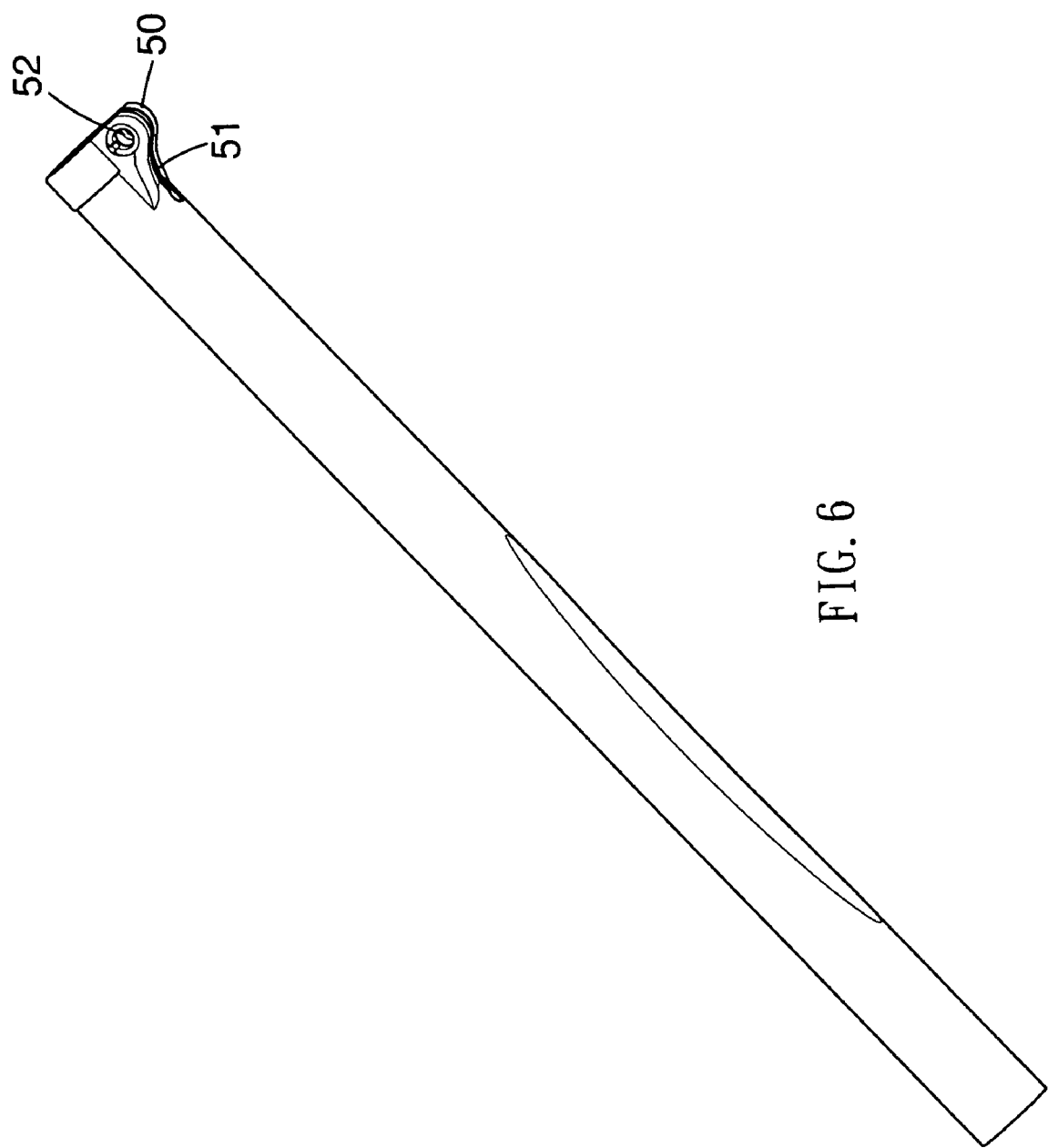
FIG. 6 shows the tube being cut, drilled and hydroformed.

The method of the present invention also further comprises a step of cutting, drilling, and large curve bending processes to the tube, according to subsequent processes of the bicycle tube, so the tube could be formed with a large curve shape 13 shown in FIG. 2, a slot 51 and a hole 52 shown in FIG. 6 for assembling purposes.

According to the above-mentioned method, the present invention molds unique and three-dimensional shapes, such trademarks patterns. Also, by applying to the hydroforming process, the thickened molding portion of the tube provides a sufficient thickness for molding so the three-dimensional shape could be molded completely. Therefore, the appearances and structures of bicycles are improved by having unique and three-dimensional shapes to the bicycle tubes.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

We claim:

1. A method for molding a bicycle tube comprising the steps of:
   providing a tube;
   controlling thickness of said tube by a drawing and extruding process;
   plasticizing said tube into particular diameters and shapes by plasticizing processes; and
   hydroforming a selected portion of said tube by a hydroforming device and a mold defining a mold cavity comprising large portions and narrow portions for forming particular three-dimensional shapes, the step of hydroforming said selected portion of said tube comprises the steps of:
   placing said selected portion of said tube into said mold;
   injecting pressurized liquid into said tube by said hydroforming device so that said tube is filled with the pressurized liquid;
   sealing said tube except the communication of the pressurized liquid;
   pressurizing said pressurized liquid to mold said selected portion of said tube into large portions corresponding to said large portions of said mold cavity; and
   further pressurizing said pressurized liquid to mold said selected portion of said tube into narrow portions corresponding to said narrow portions of said mold cavity.

2. The method of claim 1, wherein said plasticizing processes comprises an outer diameter process and an outer shape process.

3. The method of claim 2, wherein said outer diameter process comprises a tapering process performed by a tube plasticizing device.

4. The method of claim 2, wherein said outer diameter process comprises an expanding process performed by a tube plasticizing device.

5. The method of claim 2, wherein said outer diameter process comprises a swaging process performed by a tube plasticizing device.

6. The method of claim 2, wherein said outer diameter process comprises tapering, expanding, and swaging processes performed by tube plasticizing devices.

7. The method of claim 2, wherein said outer shape process comprises a small curve bending process performed by a tube processing device.

8. The method of claim 2, wherein said outer shape process comprises a dimpling process performed by a tube processing device.

9. The method of claim 2, wherein said outer shape process comprises a pressing process performed by a tube processing device.

10. The method of claim 2, wherein said outer shape process comprises small curve bending, dimpling and pressing processes performed by tube processing devices.

11. The method of claim 1, further comprising applying a cutting process to said tube.

12. The method of claim 1, further comprising applying a drilling process to said tube.

13. The method of claim 1, further comprising applying a large curve bending process to said tube.

14. The method of claim 1, further comprising applying cutting, drilling, and large curve bending processes to said tube.

* * * * *